United States Patent [19]

Akiyama et al.

[11] 4,081,584

[45] Mar. 28, 1978

[54] ELECTROSTATIC RECORDING MATERIAL AND METHOD FOR PREPARING THE SAME

[75] Inventors: Toyomi Akiyama, Sakai; Taiji Higaki, Nishinomiya; Eiichiro Shiratsuchi, Tokyo; Eijiro Tagami, Yokohama, all of Japan

[73] Assignees: Japan Synthetic Rubber Co., Ltd.; Kanzaki Paper Manufacturing Co., Ltd., both of Japan

[21] Appl. No.: 533,494

[22] Filed: Dec. 17, 1974

Related U.S. Application Data

[63] Continuation of Ser. No. 86,630, Nov. 3, 1970, abandoned.

[30] Foreign Application Priority Data

Nov. 15, 1969 Japan ................................ 44-91544

[51] Int. Cl.[2] .............................................. B32B 15/08

[52] U.S. Cl. ..................................... 428/514; 427/58; 427/121; 427/388 C; 427/385 R; 427/391; 428/457; 428/461; 428/462; 428/463; 428/512; 428/513; 428/511; 428/521; 428/522; 428/523

[58] Field of Search ............... 428/500, 511, 512, 513, 428/521, 523, 461, 462, 463, 458, 514, 522, 457; 427/385, 58, 121, 388 C, 385 R, 391

[56] References Cited

U.S. PATENT DOCUMENTS

| | | | |
|---|---|---|---|
| 2,875,054 | 2/1959 | Griggs et al. | 96/85 |
| 3,216,853 | 11/1965 | Gess | 428/292 |
| 3,428,485 | 2/1969 | Bonzagni | 428/513 |
| 3,459,593 | 8/1969 | Cole | 428/512 |
| 3,487,032 | 12/1969 | Guziak et al. | 260/8 |
| 3,530,080 | 9/1970 | Kirkwood | 428/514 |
| 3,920,880 | 11/1975 | Akiyama et al. | 427/121 |
| 3,956,571 | 5/1976 | Takao et al. | 428/513 |

*Primary Examiner*—Cameron K. Weiffenbach
*Attorney, Agent, or Firm*—Craig & Antonelli

[57] ABSTRACT

An electrostatic recording material having a good workability and a very good recording characteristic is prepared by coating such a base sheet as paper, plastic film, metal plate, etc. with an aqueous dispersion comprising (A) 100 parts by weight of at least one water-insoluble polymer comprising at least one monomer selected from ethylenic monomers and conjugated diolefinic monomers, and (B) 1-200 parts by weight of at least one water-soluble salt of polymer containing carboxyl groups by means of an air knife coater, roll coater, etc. It is possible to use not more than 6 parts by weight of the heretofore well-known nonionic emulsifier and/or the well-known anionic emulsifier together with said component.

40 Claims, No Drawings

ELECTROSTATIC RECORDING MATERIAL AND METHOD FOR PREPARING THE SAME

This is a continuation of application Ser. No. 86,630 filed Nov. 3, 1970 and abandoned.

This invention relates to an electrostatic recording material comprising a base sheet and a dried layer of aqueous dispersion of polymers laid on the surface of the base sheet, and to a method for preparing the same. The electrostatic recording material is applied to an electrostatic recording system which records electrical signals directly on the image-bearing layer.

The electrostatic recording system has recently been widely applied to a facsimile or a computer input-output system or the like as a system suitable for high speed recording in a high speed telecommunication system, a high speed graphic reproduction system, etc., but the electrostatic recording material as a recording medium basically comprises a highly dielectric film layer, which serves as an electric-charge-retentive layer, and a base sheet of lower resistance, which supports the film layer. Electrostatic images of electrical signal formed on the electric-charge-retentive layer are made visible by a toner which has a polarity opposite to the polarity of the electrostatic image charge, and brought into permanent visible images by further fixing treatment.

The charge-retentive layer corresponds to a dielectric member in a condenser. To increase a charge density of the electrostatic image and enhance a recording efficiency, it is preferable that the effective film thickness is as thin as possible, but the practical film thickness is about 2 to 20 microns because a strength capable of withstanding a strong electrical field such as $10^6$ V/cm is also required.

It is known that the electric-charge-retentive layer of the electrostatic recording sheet may consist essentially of any kind of insulating or dielectric resin such as polyethylene, polyvinyl acetal, silicone resin, polyacrylate, polyvinylidene chloride, nitrocellulose, polyvinyl acetaldehyde, vinyl acetate-vinyl chloride copolymer, vinyl acetate-crotonic acid copolymer, acrylic acid ester-methacrylic acid ester copolymer, etc. and the mixture thereof. These insulating polymeric materials are commonly coated onto the surface of base sheet as a solution dissolved in a suitable organic solvent such as acetone, toluene, benzene, methyl ethyl ketone, etc. However, the use of the organic solvent solution of the polymeric materials is not desirable for several reasons including fire hazard, toxicity, handling and economy of the organic solvent.

A number of improvements have so far been proposed in order to overcome or compensate for the above disadvantages. However, a practical, satisfactory product has not yet been obtained. Many so-called improvements introduce unexpected additional difficulties. For example, such water-soluble natural polymers as casein, gelatin, starch, etc. have a low specific resistance and thus a poor dielectric strength as well as a low charge acceptance. Accordingly, such natural polymers are not practically used. For another example, as a method for using an aqueous dispersion of a polymeric material in an electrostatic recording material, Japanese Patent Publication No. 14,348/63 discloses a method for coating paper with an emulsion or suspension prepared by emulsifying or suspending random copolymers, graft copolymers or block copolymers having a second order transition point of 100° C or higher, which are comprised of vinyl acetate-acrylic ester, vinyl acetate-methacrylic ester or vinyl acetate-styrene, with a nonionic or an anionic surface active agent. However, in such an aqueous dispersion, it is hard to maintain good mechanical and thermal stability when coated onto the base sheet. An increase in the amount of the emulsifier for improving the stability inevitably lowers the recording characteristics, and it is very difficult to change practical applicabilities such as a flexibility of the film to a great degree and to prevent triboelectricity and background, etc.

As a result of various studies on a method for preparing an electrostatic recording material using an aqueous dispersion of polymeric materials, the present inventors have found that, when water-soluble salts of polymers containing carboxyl groups are allowed to be contained in an aqueous dispersion of polymers, it is possible to select a wide range of monomer compositions and apply the thus prepared aqueous dispersion onto the surface of base sheet in a very stable state mechanically and thermally, and the thus obtained electrostatic recording material has an excellent recording characteristic. Furthermore, all the disadvantages encountered when an organic solvent solution of polymeric material is used, that is, inflammability, toxicity, difficulty in working, economy, etc. have been completely eleminated by use of the present aqueous dispersion.

The principal object of this invention is to provide a new electrostatic recording material superior to those hitherto known.

An important object of the invention is to provide an improved electrostatic recording material having an electric-charge-retentive layer deposited from an aqueous coating composition.

A further object of the invention is to provide an electrostatic recording material having an excellent recording characteristic.

A still further object of the invention is to provide an electrostatic recording material having a sufficient flexibility so that it will not tend to flake off or crack under the pressure.

Another object of the invention is to provide processes for the manufacture of the electrostatic recording material in a more effective manner.

Other objects and effect of the present invention will be clear from the succeeding description.

According to the present invention, an electrostatic recording material is provided by coating a surface of a base sheet with an aqueous dispersion (including emulsion and suspension) comprising (A) 100 parts by weight of at least one water-insoluble polymer consisting of at least one monomer selected from ethylenic monomers and conjugated diolefinic monomers, and (B) 1–200 parts by weight of at least one water-soluble salt of polymer containing carboxyl groups, and drying the resulting coated product, whereby a dielectric or insulating electric-charge-retentive layer is formed on the surface of the base sheet.

In the present invention, as additional component, not more than 6 parts by weight of at least one emulsifier selected from nonionic emulsifiers and anionic emulsifiers may be used.

The ethylenic monomers used in the invention have 2 to 25 carbon atoms and include linear or branched olefins, such as ethylene, propylene, butylene, etc., aromatic vinyl compounds such as styrene, vinyltoluene, halogen-substituted styrenes, etc., vinyl cyanide compounds such as acrylontrile, methacrylonitrile, etc., alkyl acrylates and methacrylates such as butyl acrylate, methyl methacrylate, etc., vinyl ethers such as isopropyl vinyl ether, methyl vinyl ether, etc., and vinyl halides such as vinyl chloride, vinylidene chloride, etc.

The conjugated diolefinic monomers used in the present invention have 4 to 10 carbon atoms and include, for example, butadiene, isoprene, chloroprene, piperylene, etc. Particularly preferable monomers are alkyl acrylates, alkyl methacrylates, styrene and butadiene. These monomers may be used alone or in admixture of at least two monomers.

The water-soluble salts of polymers containing carboxyl groups used in the present invention act as a dispersing agent capable of dispersing said water-insoluble polymers into water, and include, for example, ammonium or organic amine salts of copolymers of such ethylenic monomers as ethylene, styrene, vinyltoluene, acrylonitrile, methacrylonitrile, acrylate, methacrylate, vinyl halide, acrylamide, methacrylamide, halogen-substituted styrenes, vinyl ethers, etc. with such unsaturated carboxylic acids as acrylic acid, methacrylic acid, crotonic acid, itaconic acid, maleic acid, fumaric acid, etc.; ammonium or organic amine salts of copolymers of such conjugated diolefins as butadiene, isoprene, piperylene, chloroprene, cyclopentadiene, etc., with said unsaturated carboxylic acids; and ammonium or organic amine salts of copolymers of said ethylenic monomers, said conjugated diolefins and said unsaturated carboxylic acids. Said polymers containing carboxyl groups may be prepared by polymerizing the above-mentioned monomer mixture by emulsion or suspension polymerization in aqueous phase in the presence of an emulsifying agent or a suspending agent, or by solution polymerization in an organic solvent. In view of stability, solution polymerization method is preferable. Such a solution polymerization method is disclosed, for example, in Japanese Patent No. 545,492.

Furthermore, ammonium or organic amine salts of complete or partial saponificates of polymers or copolymers of unsaturated carboxylic acid esters, ammonium or organic amine salts of polyesters containing free carboxyl groups, which are comprised of such polyhydric alcohols as ethylene glycol, propylene glycol, diethylene glycol, etc. and such polybasic carboxylic acids as maleic acid, fumaric acid, phthalic acid, adipic acid, citric acid, etc., or ammonium or organic amine salts of polyamides containing free carboxyl groups, which are comprised of such polyamines as ethylenediamine, tetramethylenediamine, hexamethylenediamine, etc. and said polybasic carboxylic acids, may be also used as a portion of said water-soluble salts of polymers.

These water-soluble salts of polymers contribute to stabilization of the aqueous dispersion, but when their carboxyl group content is considerably increased, the recording characteristic is damaged. Therefore, practically, it is particularly preferable that the carboxyl group content of said polymer is within a range of 8 to 50 mole percent.

The nonionic emulsifiers used in the present invention include those heretofore usually used as a nonionic surface active agent, such as polyoxyethylene alkyl ethers, polyoxyethylene aryl ethers, polyoxyethylene alkyl esters, polyoxyethylene aryl esters, polyoxyethylenepolyoxypropylene block copolymers, etc.

The anionic emulsifiers used in the present invention include those heretofore usually used as an anionic surface active agent, for example, alkali salts, ammonium salts and amine salts of higher fatty acids, higher alkylsulfuric acids, alkylarylsulfonic acids, dialkylsulfosuccinic acids, resin acids, etc.

In view of the stability of the aqueous dispersion of polymer, the use of the above-mentioned emulsifiers is preferable, but in view of the recording characteristic, it is not preferable that the aqueous dispersion contains a large amount of the emulsifier.

The emulsifier gives an undesirable influence upon the recording characteristic, for example, low charge acceptance and background, etc., depending upon the amount of the emulsifier used, and therefore, the total amount of the emulsifiers must not exceed 6 parts by weight per 100 parts by weight of said water-insoluble polymers.

Even when only the water-soluble salts of polymers containing carboxyl groups are used without using any emulsifier, an aqueous dispersion of polymer having an excellent stability and recording characteristic can be obtained by properly selecting the kind and amount of said polymers.

The aqueous dispersion of polymer used in the present invention can be prepared by polymerizing or copolymerizing at least one monomer selected from ethylenic monomers and conjugated diolefinic monomers in the presence of said water-soluble salts of polymer and, if necessary, said emulsifier; or adding the watersoluble salts of polymer, after the polymerization or copolymerization in the presence of the emulsifier, to the resulting polymers or copolymers; or adding, if necessary, the emulsifier, after the polymerization or copolymerization in the presence of the water-soluble salts of polymer, to the resulting polymers or copolymers; or by polymerizing or copolymerizing said monomers by solution polymerization, and emulsifying or dispersing the resulting polymers or copolymers, by means of the water-soluble salts of polymer and, if necessary, the emulsifier, into an oil-in-water type emulsion or suspension. Furthermore, at least two kinds of these aqueous dispersions may be mixed in a proper proportion and used.

According to the present invention, the electrostatic recording material can be prepared by coating a base sheet with said aqueous dispersion of polymers by means of a coater widely used in preparing ordinary coated paper, for example, an air knife coater, roll coater, blade coater, etc., as it is, and drying the coated base sheet.

It is preferable to control the amount of said aqueous dispersion to be applied, so that a layer having a thickness of 2–20 $\mu$ may be formed as a dry film.

The aqueous dispersion of polymer can be used alone in the present invention, but it is possible to mix and use an additive heretofore usually used in preparing the electrostatic recording material, to such a degree as not to impair the recording characteristic, for example, inorganic and/or organic powder such as clay, titanium oxide, lake, zinc oxide, calcium carbonate, barium sulfate, starch, polyethylene, polystyrene, polyvinylidene chloride, etc., dispersing agent such as phosphate, etc., a thickener such as polyvinyl alcohol, carboxymethylcellulose, gum arabic, etc., and other plasticizer, dyestuff, defoaming agent, etc.

As the base sheet for the present recording material, paper, plastic sheet (synthetic paper, plastic film or the like), metal plate, etc. may be used, but in view of a low cost and ready workability, paper is most preferable.

It is necessary that the base sheet has a proper physical strength, smoothness, extensibility, whiteness, bulkiness, thickness, etc., and further it is generally necessary that the base sheet has an electroconductivity corresponding to a volume resistivity of $10^5$–$10^{11}\Omega/cm^2$ at a relative humidity of 10–90%. Therefore, in the case of the most frequently used paper base sheet, a low resistance treatment is usually applied to the paper by impregnating or coating the paper with inorganic salts, carbon black, or fine powders of aluminum, copper, nickel, etc., or polymeric electrolyte, for example, vinylbenzyl quaternary ammonium salt, sodium alginate, sodium polyacrylate, sodium polymethylene sulfonate, etc. Such electroconductive treatment is disclosed, for example, in Japanese Utility Model Publication No. 20592/63 and Japanese Patent Publication Nos. 12,099/63 and 2,878/70, etc.

The present electrostatic recording material is not only used in a system for impressing signal charges directly onto a surface of a dielectric material layer, but also practically applicable as a charge receptor medium (charge-retentive layer) in the so-called method of transfer of electrostatic images wherein electrostatic images formed on a master plate are transferred to other charge-retentive layer and developed and recorded. As such a method of transfer of electrostatic image, there has been known, for example, a method for transferring electrostatic images formed on the master plate to a charge-retentive layer by applying an electric field thereto or forming a short circuit between them. The values of electric resistance of the base sheet of the charge receptor medium used in such a method of transfer of electrostatic images can take a wider range than that of the system for directly impressing electrical signals. For example, in the case of the paper base sheet, the ordinary quality paper may be used as it is without any treatment with said electroconductivity-improving agent.

As will be understood from the above, the characteristics and advantages of the invention are as follows:

The electric-charge-retentive layer of the product is formed by polymers consisting of monomers selected from the wide range, and it permits a clearer image with less "noise" and less "background" even under changes in temperature or external humidity. Further, the electric-charge-retentive layer has a sufficient flexibility and does not tend to flake off or crack under a pressure such as the contact with the recording stylus. Furthermore, the aqueous dispersion of polymer of the present invention has a good thermal and mechanical stability, therefore, easy operation is made possible through the conventional coating process. And also, the above coating process is done under preferable conditions; that is, free from fire hazard and toxicity and at considerably lower cost.

The image-retentive layer of this invention has also distinctive characteristics in writing and stamping by water base ink, as a result of using the water soluble salts of polymer in the layer.

If desired, the layer of this invention can easily be made more writable and stampable by allowing some organic or inorganic powder materials to be contained therein. In such case, the powder can easily be dispersed into the aqueous dispersion because of the aqueous phase. Thus, the surface of the electric-charge-retentive layer substantially corresponds to the so-called mat finish and presents a natural appearance similar to commonly used business paper. And also the surface is easy to write upon with a pencil or ball-point pen and also easy to stamp or mark with fluid pen ink because of the good receptivity and retention.

Now, the present invention will be explained in detail, referring to Examples, but these Examples are merely illustrative, but not limitative of the present invention. In the Examples, parts and percentage representing proportions are parts by weight and % by weight, respectively, unless otherwise specified. The carboxyl-containing polymers employed in the Examples were prepared by radical polymerization in methanol in the presence of azobisisobutyronitrile as initiator.

EXAMPLE 1

An aqueous ammoniacal dispersion of polymers having a solid content of 40% was prepared by polymerizing 100 parts of a monomer mixture consisting of 20% of butadiene and 80% of styrene in the presence of 10 parts of a water-soluble ammonium salt of a terpolymer containing 30% of butadiene, 55% of methyl methacrylate and 15% of methacrylic acid and 2 parts of polyoxyethylene lauryl ether (HLB: 17). The thus obtained dispersion was coated onto a surface of paper having a thickness of 55 μ, which had been subjected to a low resistance treatment by impregnating the paper with polyvinylbenzyltrimethyl ammonium chloride, by means of an air knife coater, and then dried with hot air at 120° C, whereby a dry film having a thickness of 5 μ was formed. The surface resistivity of the thus obtained electrostatic recording material was $10^{14}$ ohm at 20° C, 60% RH (relative humidity) and 100 volt DC. Pulse signals of −750V and 10 μ sec were impressed onto the electrostatic recording material by means of single stylus recording head having a line density of 6 lines/mm to form electrostatic images, and then the impressed recording material was subjected to magnetic brush development by a toner for the negative charge development, whereby clear recording images having a very good contract were obtained. When high pressure pulse signals of −1000V and 50 μ sec were impressed to said recording material by means of a lettertype electrode, the images made visible by a toner for the negative charge development were very clear without any dielectric breakdown of the dielectric layer.

EXAMPLE 2

An aqueous ammoniacal dispersion of polymers having a solid content of 42%, which was prepared by polymerizing 100 parts of a monomer mixture containing 15% butadiene and 85% styrene in the presence of 14 parts of a water soluble ammonium salt of a terpolymer containing 30% butadiene, 55% methyl methacrylate and 15% methacrylic acid, was coated onto a surface of paper having a thickness of 55 μ, which had been subjected to a low resistance treatment by impregnating the paper with lithium chloride and polyethylene glycol, by means of a roll coater, and then was dried with hot air at 120° C, whereby a dry film having a thickness of 7 μ was formed. The surface resistivity of the thus obtained electrostatic recording material was $10^{13}$ ohm at 20° C, 60% RH and 100 volt DC. Pulse signals of −900V and 10 μ sec. were impressed onto the electrostatic recording material by means of a recording head with multi-styli having a line density of 6 lines/mm to form electrostatic images. When the recording material was subjected to a cascade development by a toner for the negative charge development, very clear recording images were obtained.

In the following Examples 3–22, other embodiments of aqueous dispersions of polymers applicable to the present invention are given. In Example 5, a polymer dispersion was prepared by polymerizing the monomer mixture in the presence of the water-soluble ammonium salt of carboxyl-containing polymer and thereafter adding the nonionic emulsifier to the polymerization product.

In Example 19, a polymer dispersion was prepared by polymerizing the monomer mixture in the presence of sodium-lauryl sulfate and adding thereafter the water-soluble ammonium salt of carboxyl-containing polymer to the polymerization product.

In Examples 21 and 22, polymer dispersions were prepared by polymerizing the monomer mixture in the presence of 15 and 10 parts of the water-soluble ammonium salts of carboxyl-containing polymers, respectively, and thereafter adding the rest of said water-soluble salts to the respective polymerization products.

In the other Examples, polymer dispersions were prepared in the same manner as in Example 1. When the electrostatic recording materials were prepared using these dispersions in the same manner as in Example 1 or 2, the desired object of the present invention was satisfied in every embodiment, and the recording materials having a good recording characteristic were obtained.

EXAMPLE 3

| | |
|---|---|
| Copolymer of butadiene-styrene (20:80) | 100 parts |
| Terpolymer of butadiene-methyl methacrylate-methacrylic acid (30:55:15) | 11 parts |
| Polyoxyethylene lauryl ether (HLB: 17) | 2 parts |

EXAMPLE 4

| | |
|---|---|
| Copolymer of butadiene-styrene (15:85) | 100 parts |
| Terpolymer of butadiene-methyl methacrylate-methacrylic acid (30:55:15) | 5.5 parts |
| Polyoxyethylene lauryl ether (HLB: 17) | 4 parts |
| Clay powders | 15 parts |

EXAMPLE 5

| | |
|---|---|
| Copolymer of butadiene-styrene (20:80) | 100 parts |
| Copolymer of methyl methacrylate-methacrylic acid (85:15) | 11 parts |
| Block copolymer of polyoxyethylene-polyoxypropylene (HLB:13) | 2 parts |

EXAMPLE 6

| | |
|---|---|
| Copolymer of butadiene-styrene (20:80) | 100 parts |
| Terpolymer of butadiene-methyl methacrylate-methacrylic acid (30:55:15) | 18 parts |
| Block copolymer of polyoxyethylene-polyoxypropylene (HLB:13) | 2 parts |
| Titanium oxide (rutile type) | 20 parts |

EXAMPLE 7

| | |
|---|---|
| Copolymer of butadiene-styrene (20:80) | 100 parts |
| Terpolymer of butadiene-methyl methacrylate-methacrylic acid (30:55:15) | 22 parts |

-continued

| | |
|---|---|
| Block copolymer of polyoxyethylene-polyoxypropylene (HLB:20) | 2 parts |

EXAMPLE 8

| | |
|---|---|
| Polystyrene | 50 parts |
| Copolymer of butadiene-styrene (60:40) | 50 parts |
| Terpolymer of butadiene-methyl methacrylate-methacrylic acid (30:55:15) | 11 parts |
| Polyoxyethylene lauryl phenyl ether (HLB: 17) | 2 parts |

EXAMPLE 9

| | |
|---|---|
| Copolymer of butadiene-styrene (10:90) | 50 parts |
| Copolymer of butadiene-styrene (50:50) | 50 parts |
| Terpolymer of butadiene-methyl methacrylate-methacrylic acid (30:55:15) | 11 parts |
| Polyoxyethylene lauryl ether (HLB: 17) | 2 parts |

EXAMPLE 10

| | |
|---|---|
| Copolymer of butadiene-methyl methacrylate (20:80) | 100 parts |
| Terpolymer of butadiene-methyl methacrylate-methacrylic acid (30:55:15) | 11 parts |
| Polyoxyethylene lauryl ether (HLB: 17) | 2 parts |

EXAMPLE 11

| | |
|---|---|
| Copolymer of styrene-butyl acrylate (80:20) | 100 parts |
| Terpolymer of butadiene-methyl methacrylate-methacrylic acid (30:55:15) | 11 parts |
| Polyoxyethylene lauryl ether (HLB: 17) | 2 parts |

EXAMPLE 12

| | |
|---|---|
| Copolymer of butadiene-methyl methacrylate (20:80) | 100 parts |
| Terpolymer of butadiene-methyl methacrylate-methacrylic acid (30:55:15) | 6 parts |
| Polyvinyl alcohol | 2 parts |
| Polyoxyethylene lauryl ether (HLB: 17) | 2 parts |

EXAMPLE 13

| | |
|---|---|
| Copolymer of styrene-butyl acrylate (80:20) | 100 parts |
| Terpolymer of butadiene-methyl methacrylate-methacrylic acid (30:55:15) | 11 parts |
| Polyoxyethylene lauryl ether (HLB: 17) | 2 parts |

EXAMPLE 14

| | |
|---|---|
| Copolymer of styrene-butadiene (80:20) | 100 parts |
| Terpolymer of butadiene-methyl methacrylate-methacrylic acid (30:55:15) | 30 parts |

-continued

| | |
|---|---|
| Polyoxyethylene lauryl ether (HLB: 17) | 1.5 parts |

EXAMPLE 15

| | |
|---|---|
| Copolymer of butadiene-styrene (20:80) | 100 parts |
| Terpolymer of styrene-methyl methacrylate-methacrylic acid (20:65:15) | 11 parts |
| Polyoxyethylene lauryl ether (HLB: 17) | 2 parts |

EXAMPLE 16

| | |
|---|---|
| Copolymer of styrene-butadiene (80:20) | 100 parts |
| Terpolymer of butadiene-methyl methacrylate-methacrylic acid (30:55:15) | 2 parts |
| Polyoxyethylene lauryl ether (HLB: 17) | 6 parts |

EXAMPLE 17

| | |
|---|---|
| Copolymer of styrene-butadiene (80:20) | 100 parts |
| Terpolymer of butadiene-methyl methacrylate-methacrylic acid (30:55:15) | 50 parts |
| Polyoxyethylene lauryl ether (HLB: 17) | 2 parts |

EXAMPLE 18

| | |
|---|---|
| Copolymer of styrene-butadiene (80:20) | 100 parts |
| Terpolymer of butadiene-methyl methacrylate-methacrylic acid (30:55:15) | 100 parts |
| Polyoxyethylene lauryl ether (HLB: 17) | 2 parts |

EXAMPLE 19

| | |
|---|---|
| Copolymer of butadiene-styrene (20:80) | 100 parts |
| Terpolymer of butadiene-methyl methacrylate-methacrylic acid (30:55:15) | 11 parts |
| Sodium lauryl sulfate | 5 parts |

EXAMPLE 20

| | |
|---|---|
| Copolymer of butadiene-styrene (20:80) | 100 parts |
| Terpolymer of butadiene-methyl methacrylate-methacrylic acid (30:55:15) | 15 parts |
| Sodium dioctylsulfosuccinate | 2 parts |
| Polyoxyethylene lauryl ether (HLB: 17) | 2 parts |

EXAMPLE 21

| | |
|---|---|
| Copolymer of styrene-butadiene (80:20) | 100 parts |
| Four-component copolymer of butadiene-styrene-methyl methacrylate-methacrylic acid (20:20:30:30) | 200 parts |

EXAMPLE 22

| | |
|---|---|
| Copolymer of styrene-butadiene (80:20) | 100 parts |
| Terpolymer of butadiene-styrene-methacrylic acid (20:30:50) | 100 parts |

EXAMPLE 23

Conventional fine paper comprising 60% NBKP (bleached soft wood kraft pulp), 40% LBKP (bleached hard wood kraft pulp) and 10% clay as a filler, which was surface-sized with esterified starch and had a weight of 50 $g/m^2$, was used as a base sheet as it was. The same aqueous ammoniacal dispersion of polymers as in Example 1 was coated onto one side of said base sheet by means of an air knife coater, and then was dried with hot air at 120° C to form a dry film having a thickness of 5 $\mu$. The surface resistivity of the thus obtained electrostatic recording paper was $10^{13}$ ohm at 20° C, 60% RH and 100 volt DC.

Corona charge of $-7$ KV was applied to commercially available electronic photographic paper (zinc oxide photosensitive paper) in a dark place, to effect an exposure by positive pattern and form an electrostatic pattern. Then, the film surface of said electrostatic recording paper and the photo-sensitive layer of the photo-sensitive paper were placed upon each other, and back sides of these papers were short-circuited while pressing the papers. After peeling, the electrostatic recording paper was taken into a light place and developed by a toner for the negative charge development and fixed, whereby a clear image having a good contrast was obtained. The electronic photographic paper, which was used as a transfer medium, was subjected to an extinction of the electrostatic images by its entire surface exposure to light, and then was used again as the transfer medium.

In the following Examples, controls are shown. That is, electrostatic recording materials were prepared using the aqueous dispersions of the following combinations in the same manner as in Example 1 and their recording characteristic was tested. However, sufficient image density was not obtained. When the recording voltage was elevated, the dielectric layer underwent dielectric breakdown and background.

| Control A | |
|---|---|
| Copolymer of butadiene-styrene (20:80) | 100 parts |
| Terpolymer of butadiene-methyl methacrylate-methacrylic acid (30:55:15) | 11 parts |
| Polyoxyethylene lauryl ether (HLB:17) | 8 parts |

| Control B | |
|---|---|
| Copolymer of butadiene-styrene (20:80) | 100 parts |
| Terpolymer of butadiene-methyl methacrylate-methacrylic acid (30:55:15) | 1 part |
| Polyoxyethylene lauryl ether (HLB: 17) | 7 parts |

| Control C | |
|---|---|
| Copolymer of butadiene-styrene (20:80) | 100 parts |
| Polyoxyethylene lauryl ether (HLB: 17) | 8 parts |

| Control D | |
|---|---|
| Copolymer of butadiene-styrene (20:80) | 100 parts |

-continued

| Control D | |
|---|---|
| Sodium dodecylbenzene sulfonate | 8 parts |

| Control E | |
|---|---|
| Copolymer of butadiene-styrene (20:80) | 100 parts |
| Polyoxyethylene lauryl ether (HLB: 17) | 4 parts |
| Sodium dodecylbenzene sulfonate | 4 parts |

What we claim is:

1. An electrostatic recording material on which an electrostatic latent image can be formed consisting essentially of a base sheet having a dried coating thereon of an electric-charge-retentive layer of dielectric polymeric film prepared from an aqueous dispersion comprising (A) 100 parts by weight of at least one water-insoluble polymer prepared from at least one monomer selected from the group consisting of (1) conjugated diolefinic monomers and (2) ethylenic monomers selected from the group consisting of linear olefines, branched olefines, aromatic vinyl compounds, vinyl cyanide compounds, alkyl acrylates, alkyl methacrylates, vinyl ethers, and vinyl halides, and (B) 1 to 200 parts by weight of at least one water-soluble salt selected from the group consisting of an ammonium salt and organic amine salt of a copolymer selected from the group consisting of (1) copolymers of ethylenic monomers selected from the group consisting of linear olefines, branched olefines, aromatic vinyl compounds, vinyl cyanide compounds, alkyl acrylates, alkyl methacrylates, vinyl halides, acrylamide, methacrylamide, and vinyl ethers and unsaturated monobasic carboxylic acids, (2) copolymers of conjugated diolefinic monomers and unsaturated monobasic carboxylic acids, and (3) copolymers of ethylenic monomers selected from the group consisting of linear olefines, branched olefines, aromatic vinyl compounds, vinyl cyanide compounds, alkyl acrylates, alkyl methacrylates, vinyl halides, acrylamide, methacrylamide, and vinyl ethers, conjugated diolefinic monomers and unsaturated monobasic carboxylic acids, said water soluble salt of the copolymer containing 8 to 50 mole percent of carboxyl groups.

2. The electrostatic recording material according to claim 1 wherein the base sheet is paper treated with conductive material.

3. The electrostatic recording material according to claim 1, wherein the water-insoluble polymer is at least one polymer prepared from at least one monomer selected from the group consisting of alkyl acrylates, alkyl methacrylates, styrene and butadiene.

4. The electrostatic recording material according to claim 1, wherein the coating has a thickness of 2 to 20 $\mu$.

5. An electrostatic recording material according to claim 1, wherein the ethylenic monomer of (A) and (B) is one having 2 to 25 carbon atoms.

6. An electrostatic recording material according to claim 1, wherein the water-soluble salt is a salt of a copolymer of methacrylic acid.

7. The electrostatic recording material according to claim 1, wherein the water-insoluble polymer is a copolymer containing 20% by weight butadiene and 80% by weight styrene and the water-soluble salt is a salt of a copolymer containing 85% by weight methyl methacrylate and 15% by weight methacrylic acid.

8. The electrostatic recording material according to claim 1, wherein the water-insoluble polymer is a copolymer containing 20% by weight butadiene and 80% by weight styrene and the water-soluble salt is a salt of a terpolymer containing 20% by weight styrene, 65% by weight methyl methacrylate and 15% by weight methacrylic acid.

9. The electrostatic recording material of claim 1, wherein the water-insoluble polymer is a copolymer containing 80% by weight styrene and 20% by weight butadiene and the water-soluble salt is a salt of a copolymer containing 20% by weight butadiene, 20% by weight styrene, 30% by weight methyl methacrylate and 30% by weight methacrylic acid.

10. The electrostatic recording material of claim 1, wherein said water-insoluble polymer is a copolymer containing 80% by weight styrene and 20% by weight butadiene and the water-soluble salt is a salt of a terpolymer containing 20% by weight butadiene, 30% by weight styrene and 50% by weight methacrylic acid.

11. The electrostatic recording material according to claim 1, wherein the conjugated diolefinic monomer of (A) and (B) is one having 4 to 10 carbon atoms.

12. The electrostatic recording material according to claim 11, wherein the conjugated diolefinic monomer is selected from the group consisting of butadiene, isoprene, chloroprene and piperylene.

13. The electrostatic recording material according to claim 1, wherein said aqueous dispersion also comprising not more than 6 parts by weight of at least one emulsifier selected from the group consisting of nonionic emulsifiers and anionic emulsifiers per 100 parts by weight of the water-insoluble polymer.

14. The electrostatic recording material according to claim 13, wherein the nonionic emulsifier is selected from the group consisting of polyoxyethylene alkyl ethers, polyoxyethylene aryl ethers, polyoxyethylene alkyl esters, polyoxyethylene aryl esters, and polyoxyethylene-polyoxypropylene block copolymers.

15. The electrostatic recording material according to claim 13, wherein the anionic emulsifier is selected from the group consisting of alkali metal salts, amine salts and ammonium salts of higher fatty acids, higher alkylsulfuric acids, alkylaryl sulfonic acids, dialkylsulfosuccinic acids and resin acids.

16. The electrostatic recording material according to claim 1, wherein the dielectric polymer film additionally contains at least one powder selected from the group consisting of organic and inorganic powders.

17. The electrostatic recording material according to claim 16, wherein the powder is at least one synthetic polymer powder.

18. The electrostatic recording material according to claim 16, wherein the powder is starch particles.

19. The electrostatic recording material according to claim 16, wherein the powder is at least one pigment.

20. An electrostatic recording material according to claim 1, wherein the water-soluble salt is a salt of a terpolymer of butadiene, methyl methacrylate, and methacrylic acid.

21. The electrostatic recording material according to claim 1, wherein the aqueous dispersion contains 50 parts by weight of polystyrene and 50 parts by weight of a copolymer containing 60% by weight butadiene and 40% by weight styrene.

22. The electrostatic recording material according to claim 20, wherein the terpolymer contains 30% by weight butadiene, 55% by weight methyl methacrylate and 15% by weight methacrylic acid.

23. The electrostatic recording material according to claim 22, wherein the water-insoluble polymer is a polymer containing 20% by weight butadiene and 80% by weight methyl methacrylate.

24. The electrostatic recording material according to claim 22, wherein the aqueous dispersion contains 50 parts by weight of a copolymer containing 10% by weight butadiene and 90% by weight styrene and 50 parts by weight of a copolymer containing 50% by weight butadiene and 50% by weight styrene.

25. The electrostatic recording material according to claim 22, wherein the water-insoluble polymer is a copolymer containing 80% by weight styrene and 20% by weight butyl acrylate.

26. The electrostatic recording material according to claim 22, wherein the water-insoluble polymer is a polymer of butadiene and styrene or methyl methacrylate.

27. The electrostatic recording material according to claim 26, wherein the water-insoluble polymer is a polymer containing 10, 15, 20 or 60% by weight of butadiene and 90, 85, 80 or 40% by weight of styrene, respectively.

28. A method for preparing an electrostatic recording material, which comprises preparing an aqueous dispersion comprising (A) 100 parts by weight of at least one water-insoluble polymer prepared from at least one monomer selected from the group consisting of (1) conjugated diolefinic monomers, and (2) ethylenic monomers selected from the group consisting of linear olefines, branched olefines, aromatic vinyl compounds, vinyl cyanide compounds, alkyl acrylates, alkyl methacrylates, vinyl ethers, and vinyl halides, and (B) 1-200 parts by weight of at least one water-soluble salt selected from the group consisting of an ammonium salt and organic amine salt of a copolymer selected from the group consisting of (1) copolymers of ethylenic monomers selected from the group consisting of linear olefines, branched olefines, aromatic vinyl compounds, vinyl cyanide compounds, alkyl acrylates, alkyl methacrylates, vinyl halides, acrylamide, methacrylamide, and vinyl ethers and unsaturated monobasic carboxylic acids, (2) copolymers of conjugated diolefinic monomers and monobasic unsaturated carboxylic acids, and (3) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers, conjugated diolefinic monomers and monobasic unsaturated carboxylic acids, said water soluble salt of the copolymer containing 8 to 50 mole percent of carboxyl groups, and coating a surface of a base sheet with said aqueous dispersion and drying the thus coated product.

29. A method according to claim 28, wherein a water-soluble salt is a salt of a copolymer of methacrylic acid.

30. The method according to claim 28, wherein the water-soluble salt is an ammonium salt of a terpolymer of butadiene, methyl methacrylate and methacrylic acid, and the water-insoluble polymer is a copolymer of butadiene and styrene or methyl methacrylate.

31. The method according to claim 20, wherein the aqueous dispersion is obtained by polymerizing the monomer constituting the component (A) in the presence of the water-soluble salt of polymer containing carboxyl groups in water.

32. The method according to claim 28, wherein the aqueous dispersion additionally contains at least one powder selected from the group consisting of organic and inorganic powders.

33. The method according to claim 32, wherein the powder is at least one synthetic polymer powder.

34. The method according to claim 32, wherein the powder is starch powder.

35. The method according to claim 32, wherein the powder is at least one pigment.

36. The method according to claim 20, wherein not more than 6 parts by weight of at least one emulsifier selected from the group consisting of nonionic emulsifiers and anionic emulsifiers is additionally used per 100 parts by weight of the water-insoluble polymer.

37. The method according to claim 21, wherein the aqueous dispersion is obtained by polymerizing the monomer constituting the component (A) in the presence of the water-soluble salt of polymer containing carboxyl groups in water and then adding thereto at least one emulsifier selected from the group consisting of nonionic emulsifiers and anionic emulsifiers.

38. The method according to claim 21, wherein the aqueous dispersion is obtained by polymerizing the monomer constituting the component (A) in the presence of the water-soluble salt of polymer containing carboxyl groups, and at least one emulsifier selected from the group consisting of nonionic emulsifiers and anionic emulsifiers in water.

39. The method according to claim 21, wherein the aqueous dispersion is obtained by polymerizing the monomer constituting the component (A) in the presence of at least one emulsifier selected from the group consisting of nonionic emulsifiers and anionic emulsifiers in water and then adding thereto the water-soluble salt of polymer containing carboxyl groups.

40. The method according to claim 36, wherein the aqueous dispersion is obtained by polymerizing the monomer constituting the component (A) by solution polymerization and dispersing the resulting polymer in water in the presence of the water-soluble salt of polymer containing carboxyl groups alone or a mixture thereof with at least one emulsifier selected from the group consisting of nonionic emulsifiers and anionic emulsifiers.

* * * * *